United States Patent
Askarpour

(10) Patent No.: US 10,082,393 B2
(45) Date of Patent: *Sep. 25, 2018

(54) SYSTEMS AND METHODS FOR CALIBRATING AND ADJUSTING A HEADING REFERENCE SYSTEM

(71) Applicant: INNOVATIVE SOLUTIONS & SUPPORT, INC., Exton, PA (US)

(72) Inventor: Shahram Askarpour, Media, PA (US)

(73) Assignee: Innovative Solutions & Support, Inc., Exton, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/902,047

(22) Filed: Feb. 22, 2018

(65) Prior Publication Data

US 2018/0180417 A1 Jun. 28, 2018

Related U.S. Application Data

(63) Continuation of application No. 15/278,743, filed on Sep. 28, 2016, now Pat. No. 9,921,063, which is a continuation of application No. 15/060,358, filed on Mar. 3, 2016, now Pat. No. 9,476,734, which is a continuation-in-part of application No. 14/881,114, filed on Oct. 12, 2015, now Pat. No. 9,470,550, which (Continued)

(51) Int. Cl.

| G01C 17/26 | (2006.01) |
|---|---|
| G01C 17/38 | (2006.01) |
| B64D 43/00 | (2006.01) |
| G01C 25/00 | (2006.01) |
| G01C 21/20 | (2006.01) |

(52) U.S. Cl.
CPC ............. *G01C 17/38* (2013.01); *B64D 43/00* (2013.01); *G01C 21/20* (2013.01); *G01C 25/00* (2013.01)

(58) Field of Classification Search
USPC ....... 33/318, 319, 355 R, 356, 357; 324/244, 324/202; 701/3, 4, 5, 6, 449, 525, 530; 702/85, 92, 93, 94, 95
See application file for complete search history.

(56) References Cited

U.S. PATENT DOCUMENTS

| 4,031,630 A * | 6/1977 | Fowler ................... G01C 17/38 33/356 |
|---|---|---|
| 4,091,543 A * | 5/1978 | Lapeyre ................. G01C 17/38 33/356 |

(Continued)

*Primary Examiner* — Richard A Goldman
(74) *Attorney, Agent, or Firm* — Bryan Cave Leighton Paisner LLP

(57) ABSTRACT

Systems and methods of calibrating and adjusting for deviations in a vehicle's heading system, such as the attitude heading and reference system of an aircraft or the heading system of a ship, positioned along the Earth's surface involve calibrating magnetometers for hard iron and misalignment errors using single heading measurements. This can be accomplished by obtaining both actual and theoretical readings for the magnetometer of the heading system, and comparing these values to obtain calibration values for the heading system. The vehicle may be repositioned, such as to North, South, East, and west magnetic headings, with the procedure repeated at each of these headings, and the calibration values averaged, further increasing the accuracy.

3 Claims, 5 Drawing Sheets

Related U.S. Application Data is a continuation of application No. 13/833,513, filed on Mar. 15, 2013, now Pat. No. 9,157,747.

(56) References Cited

U.S. PATENT DOCUMENTS

| | | | | |
|---|---|---|---|---|
| 4,143,467 A * | 3/1979 | Erspamer | G01C 17/38 | 33/356 |
| 4,347,730 A * | 9/1982 | Fisher | G01C 17/38 | 702/93 |
| 4,797,841 A * | 1/1989 | Hatch | G01C 17/38 | 324/245 |
| 4,870,602 A * | 9/1989 | Baumker | G01C 17/38 | 324/245 |
| 5,170,354 A * | 12/1992 | Ueno | G01C 17/38 | 33/356 |
| 5,182,514 A * | 1/1993 | Rice, Jr. | G01R 33/025 | 324/244 |
| 5,297,065 A * | 3/1994 | Cage | G01C 17/38 | 33/356 |
| 5,672,967 A * | 9/1997 | Jensen | G01R 33/0206 | 324/247 |
| 5,682,335 A * | 10/1997 | Assous | G01C 17/38 | 33/318 |
| 5,761,094 A * | 6/1998 | Olson | G01C 17/38 | 324/202 |
| 6,161,062 A * | 12/2000 | Sicre | G01S 3/48 | 340/974 |
| 6,282,803 B1 * | 9/2001 | Dunne | G01C 17/38 | 324/253 |
| 6,408,251 B1 * | 6/2002 | Azuma | G01C 17/38 | 701/530 |
| 6,427,349 B1 * | 8/2002 | Blank | B60K 35/00 | 324/252 |
| 6,543,146 B2 * | 4/2003 | Smith | G01C 17/38 | 33/356 |
| 6,860,023 B2 * | 3/2005 | Manfred | G01C 17/38 | 324/244 |
| 7,146,740 B2 * | 12/2006 | Manfred | G01C 17/38 | 33/356 |
| 7,154,267 B2 * | 12/2006 | Withanawasam | G01C 17/38 | 324/244 |
| 7,266,452 B2 * | 9/2007 | Ockerse | G01C 17/28 | 701/530 |
| 7,451,549 B1 * | 11/2008 | Sodhi | G01C 17/38 | 33/356 |
| 7,587,277 B1 * | 9/2009 | Wells | G01C 21/165 | 701/510 |
| 7,891,103 B2 * | 2/2011 | Mayor | G01C 17/38 | 33/356 |
| 8,061,049 B2 * | 11/2011 | Mayor | G01C 17/38 | 33/356 |
| 8,108,171 B2 * | 1/2012 | Judd | G01C 17/38 | 324/246 |
| 8,209,140 B2 * | 6/2012 | Bailey | G01C 17/38 | 702/94 |
| 8,717,009 B2 * | 5/2014 | Tu | G01R 33/0035 | 324/202 |
| 9,157,747 B2 * | 10/2015 | Askarpour | G01C 21/20 | |
| 2004/0123474 A1 * | 7/2004 | Manfred | G01C 17/38 | 33/352 |
| 2005/0138825 A1 * | 6/2005 | Manfred | G01C 17/38 | 33/356 |
| 2006/0152217 A1 * | 7/2006 | Withanawasam | G01C 17/38 | 324/244 |
| 2007/0163132 A1 * | 7/2007 | Parks | G01C 17/38 | 33/356 |
| 2007/0288166 A1 * | 12/2007 | Ockerse | G01C 17/28 | 701/530 |
| 2012/0086438 A1 * | 4/2012 | Tu | G01R 33/0035 | 324/202 |
| 2012/0101766 A1 * | 4/2012 | Snow | G01C 17/38 | 702/104 |
| 2012/0155770 A1 * | 6/2012 | Grzechnik | G01C 17/38 | 382/190 |
| 2012/0206129 A1 * | 8/2012 | Mahan | G01C 17/38 | 324/202 |
| 2013/0245984 A1 * | 9/2013 | Sheng | G01R 33/0035 | 702/94 |
| 2013/0345972 A1 * | 12/2013 | Askarpour | G01C 17/38 | 701/505 |
| 2014/0136135 A1 * | 5/2014 | Drukier | G01T 7/005 | 702/94 |

* cited by examiner

SYSTEMS AND METHODS FOR CALIBRATING AND ADJUSTING A HEADING REFERENCE SYSTEM

CROSS-REFERENCE TO RELATED APPLICATIONS

This application claims the benefit to and is a continuation of U.S. patent application Ser. No. 15/278,743 filed on Sep. 28, 2016, which is a continuation of U.S. patent application Ser. No. 15/060,358 filed on Mar. 3, 2016 (now, U.S. Pat. No. 9,476,734), which is a continuation-in-part application of U.S. patent application Ser. No. 14/881,114 filed on Oct. 12, 2015 (now, U.S. Pat. No. 9,470,550), which is a continuation of U.S. patent application Ser. No. 13/833,513 filed on Mar. 15, 2013 (now, U.S. Pat. No. 9,157,747). The contents of these applications are hereby incorporated by reference in their entireties.

FIELD OF THE INVENTION

The present invention relates to systems and methods for calibrating and adjusting for deviations in heading reference systems on vehicles, such as attitude heading reference systems on aircraft or heading systems on ships, in which the one or more magnetometers in such systems are calibrated using actual and theoretical readings at various magnetic headings of the vehicle and are re-calibrated or adjusted for deviations relating to hard iron disturbances and manufacturing defects at known magnetic headings of the vehicles.

BACKGROUND OF THE INVENTION

Typically, vehicles having a heading system, such as an aircraft having an attitude and heading reference system (AHRS), must be periodically calibrated to ensure a minimization of measurement errors. The measurement errors may be due to factors such as hard iron disturbances and/or installation misalignment associated with magnetometers or other components of the heading system. Most prior art calibration methods require numerous repositioning of the vehicles for as many as eight or more different positions to come up with an approximate calibration number. The approximate calibration number is then periodically recalculated during flight of the aircraft to minimize estimation errors. None of the prior art methods known to applicant utilize theoretical magnetic field properties of the Earth, such as theoretical values for horizontal and vertical intensity of the magnetic field at the location of the positioned vehicle, such as the aircraft on the tarmac, for comparison with actual magnetometer readings at such a position. These prior art calibration methods are time-consuming and increase the complexity of the calibration procedure and, potentially, affect the accuracy of the calibrations. Examples of such prior art methods are disclosed in U.S. Pat. Nos. 7,587,277; 8,061,049; 7,891,103; 7,146,740; and 6,860,023, none of which use the theoretical magnetic components of the Earth's magnetic field, such as obtained from a web site, to calibrate the AHRS heading.

In view of the foregoing, there is a need for simplified systems and methods that can quickly and accurately calibrate and adjust a vehicle's heading system in a manner that accounts for errors resulting from hard iron disturbances, misalignment of vehicles' components, and other factors that negatively impact the heading system.

SUMMARY OF PARTICULAR EMBODIMENTS OF THE INVENTION

The present invention is directed to systems and methods that adjust for deviations in an attitude heading reference system. These techniques efficiently and accurately adjust for possible deviations that may occur when obtaining measurements using an AHRS or other heading reference system that is installed in a vehicle. They may be used for the purpose of navigation by providing accurate measurements regarding the orientation and direction of the vehicle. Additionally, these techniques can allow for stabilizing and controlling the placement of hardware components on a vehicle (e.g., placement of antennas, cameras etc.) as well as providing measurement correction by adjusting, for example, cameras in an imaging system that may be installed on the vehicle.

In accordance with certain embodiments, the present invention includes a method for calibrating a heading system installed in a vehicle, such as an aircraft AHRS or one installed onboard a ship that utilizes one or more magnetometers to adjust for deviations resulting from hard iron effects and misalignments of the magnetometers. This is accomplished by using the theoretical magnetic components of the Earth's magnetic field together with actual magnetometer readings to calibrate the heading system.

In accordance with certain embodiments, an initial calibration can be performed by obtaining actual readings from the magnetometer at one or more headings for the vehicle (e.g., at four different magnetic headings corresponding to North, South, East, and West) and a set of theoretical magnetic field properties of the Earth (e.g., such as from a web site containing this information) at those locations or headings. These theoretical values comprise values for horizontal and vertical intensity of the magnetic field at each of these locations for the vehicle. A theoretical reading for the magnetometer at each of these headings is computed and then compared against the actual magnetometer readings at these same locations to obtain calibration values for the heading system. These calibration values are then utilized, such as by averaging all of the calibration values obtained, to provide a universal average gain and offset for the magnetometer, thus, universally calibrating the heading system with respect to measurement errors. In certain embodiments, the universal average gain and offset may be obtained by averaging a plurality of different calibration values that correspond to measurements taken at different locations or headings. This calibration method is preferably performed with the engine and avionics of the aircraft running, or corresponding equipment on the vehicle running. If desired, these calibrations values can be filtered through low pass filters to reduce any effects of noise.

Although the calibration method can be accomplished at a single position of the vehicle, it has been found that the accuracy may be enhanced by doing it at the four directional headings of the compass; namely, North, South, East, and West.

Moreover, once the initial calibration has been performed, the magnetometer calibration values can be derived or calculated at a later time for re-adjustment and re-calibration purposes without performing all the steps needed for the initial heading calibration method. As a result, the present invention provides a solution for adjusting for additive hard iron disturbances that may require periodically determining the magnetometer calibration values and re-adjusting for any deviations.

In addition, once an initial calibration or a subsequent re-calibration of the heading system has been performed, the present invention allows for determining the presence of hardware installation errors by computing a misalignment angle between the magnetometers and chosen vehicle axes and further adjusting the magnetometers and heading system based on the computed misalignment angle.

Furthermore, during an initial calibration or a subsequent re-calibration of the heading system the vehicle (e.g., aircraft, ship etc.) is selectively positioned along the Earth's surface (e.g., ground) and aligned to one or more known magnetic headings allowing for the efficient calculation of theoretical magnetometer readings that can be used to obtain initial calibration values and/or recalculate previously obtained calibration values based on a single known heading. As a result, the heading system of the vehicle can be adjusted and/or recalibrated to provide reliable heading information. In addition, adjustments resulting from manufacturing and/or installation errors, such as misalignment of the magnetometers, can be performed upon initial calibration and/or subsequent recalibration of the vehicle.

DETAILED DESCRIPTION OF EMBODIMENTS OF THE INVENTION

An AHRS system is commonly viewed as a triaxial sensor system that is capable of providing real-time orientation and direction information. As a result, such a system is required to be reliable, efficient and accurate. In order to calculate navigation related parameters, an AHRS system includes gyroscopes, accelerometers and magnetometers that are capable of sensing and measuring rotation, proper acceleration and magnetic field magnitude, respectively. For example, the use of magnetometers provides the necessary information for calculating the vehicle's heading as it relates to magnetic and/or true north heading. However, magnetic field measurements are susceptible to local magnetic disturbances. Specifically, the presence of ferrous materials (e.g., natural magnets) or electric magnets in the vicinity of the magnetometers can cause disturbances due to the generation and presence of additional magnetic fields. Importantly, such a hard iron effect can result in erroneous heading measurements from the AHRS and should be periodically adjusted in order to avoid dangerous conditions during operation of the vehicle.

Furthermore, additional disturbances may occur as a result of faulty installation procedures (e.g., mounting) of a separately mounted triaxial magnetometer. Specifically, the misalignment of the magnetometers from chosen axes can cause offset errors in the obtained measurements. In such cases, determining a misalignment angle for the magnetometers can provide the ability to calibrate the heading system to ensure that the obtained measurements are accurate.

Accordingly, systems and methods are provided for periodically calibrating and adjusting the heading system by determining calibration values for the magnetometers to account for hard iron disturbances and possible misalignments of the magnetometers, thereby enabling reliable and accurate heading measurements to be obtained from an AHRS or other heading system. The following describes embodiments of the present invention in more detail with reference to the accompanying figures.

Figure 1:
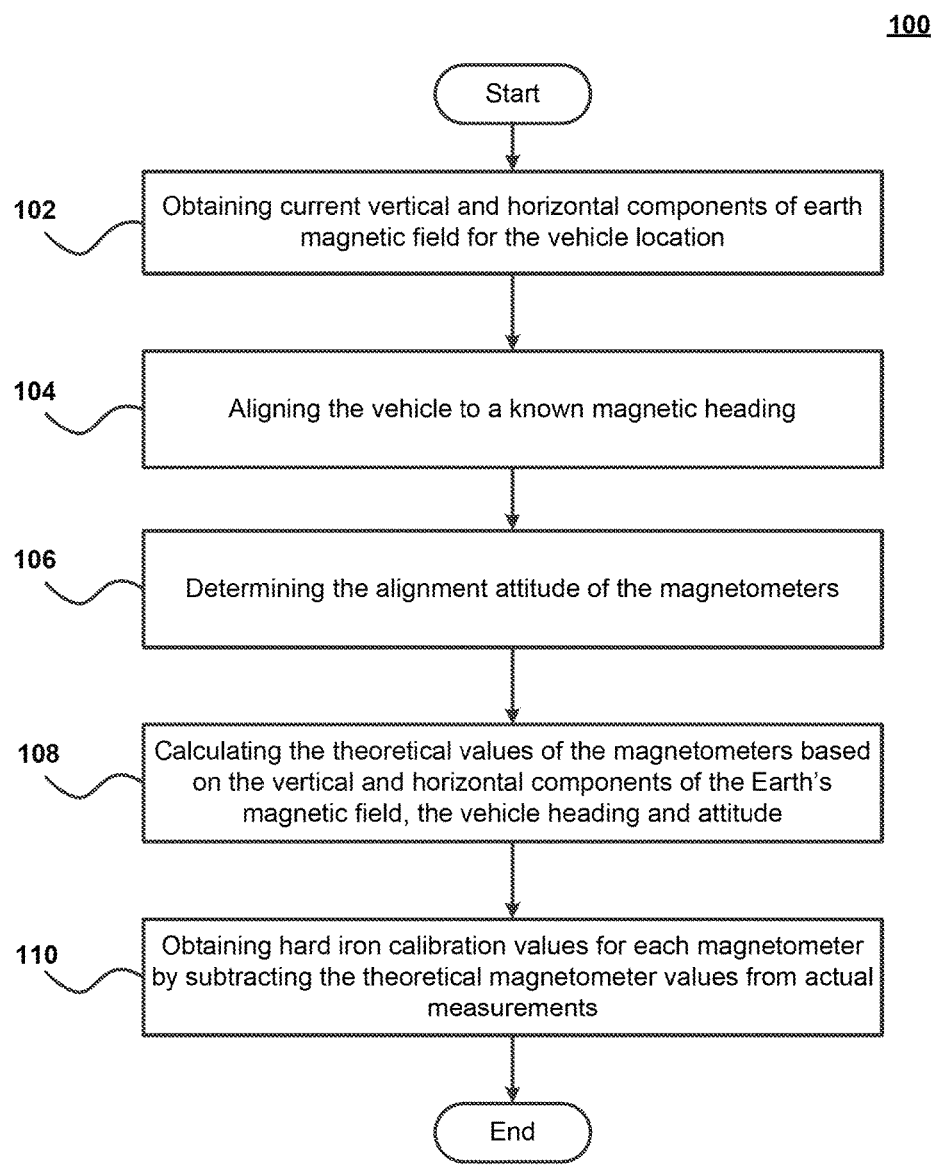
FIG. 1 is a flow diagram illustrating a process for initially calibrating a heading reference system in accordance with some embodiments of the present invention.

Initially referring to FIG. 1, a process flow diagram illustrates a method 100 for performing an initial calibration of a vehicle heading system containing one or more magnetometers. As illustrated by way of example in the flow diagram of FIG. 1, and as will be explained in greater detail hereinafter, the current vertical and horizontal components of the Earth's magnetic field for the particular location of the vehicle, such as an aircraft or a ship, are obtained. This is represented by block 102 in FIG. 1. The vehicle is positioned or aligned to a known magnetic heading, as represented by block 104 in FIG. 1. The alignment attitude of the magnetometers is then determined, as represented by block 106 in FIG. 1. The theoretical values of the magnetometers are then calculated based on the vertical and horizontal components of the Earth's magnetic field, the vehicle heading and vehicle attitude, as represented by block 108 in FIG. 1. The theoretical magnetometer values are then subtracted from the actual measurements to obtain hard iron calibration values for each magnetometer in the heading system, as represented by block 110 in FIG. 1.

Typically, for example, in an attitude heading and reference system, or AHRS, on board an aircraft, the magnetic heading and pitch angle calibration of the AHRS is a very time-consuming operation and is often limited to the geographic vicinity of the airport where the calibration was performed. That is not the case with method 100 of the present invention which may be used, for example, with triaxial magnetometers aligned to the x, y, and z planes, or with two-axis magnetometer arrangements. In either instance, a set of theoretical magnetic field properties of the Earth, such as the theoretical values for horizontal intensity and vertical intensity of the magnetic field, at the location of the positioned vehicle is obtained. The information for these theoretical values may preferably be obtained from a website, or any other suitable source and/or database that provides information relating to the Earth's magnetic field. An exemplary organization that provides access to geophysical data from which the theoretical valued can be derived is the National oceanic and Atmospheric Association (NOAA) which maintains a website associated with the National Geophysical Data Center (NGDC). For example, an aircraft whose conventional AHRS is being calibrated, would preferably be positioned in a magnetically clean and flat area heading magnetic North with its engines and avionics running. Preferably the conventional magnetic calibration page or interface of the AHRS would be accessed and the theoretical values obtained from such a website, including the total field as well as the horizontal and vertical intensity, would be entered on the magnetic calibration page or interface and, for example, North reading would be selected. To improve accuracy, this procedure can preferably be repeated for each of the other three normal magnetic headings, East, South, and West, by first positioning the vehicle to each of these headings, repeating the procedure, and selecting the corresponding reading for that heading. Such repositioning of the aircraft can provide a more accurate estimation of the aircraft's heading by accounting for variations in the aircraft's orientation (e.g., pitch and roll angles) resulting from possible anomalies due to the ground's surface.

In this regard, it should be noted that the normal magnetometer readings without the presence of any hard iron effects (e.g., the theoretical values of the magnetometers) are defined by the following equations for each of the four normal headings North, East, South and West:

(a) When Heading North:

$$[xMag \ yMag \ zMag] =$$
$$[HI \ 0 \ VI] \begin{bmatrix} \cos\theta & \sin\theta\sin\phi & \sin\theta\cos\phi \\ 0 & \cos\theta & -\sin\phi \\ -\sin\theta & \cos\theta\sin\phi & \cos\theta\sin\phi \end{bmatrix} =$$
$$\begin{bmatrix} HI\cos\theta - & HI\sin\theta\sin\phi - & HI\sin\theta\cos\phi + \\ VI\sin\theta & VI\cos\theta\sin\phi & VI\cos\theta\cos\phi \end{bmatrix}$$

(b) When Heading East:

$$[xMag \ yMag \ zMag] =$$
$$[0 \ HI \ VI] \begin{bmatrix} \cos\theta & \sin\theta\sin\phi & \sin\theta\cos\phi \\ 0 & \cos\theta & -\sin\phi \\ -\sin\theta & \cos\theta\sin\phi & \cos\theta\sin\phi \end{bmatrix} =$$
$$\begin{bmatrix} -VI\sin\theta & HI\cos\phi\sin\phi - & HI\sin\phi\cos\theta + \\ & VI\cos\theta\sin\phi & VI\cos\theta\cos\phi \end{bmatrix}$$

(c) When Heading South:

$$[xMag \ yMag \ zMag] =$$
$$[-HI \ 0 \ VI] \begin{bmatrix} \cos\theta & \sin\theta\sin\phi & \sin\theta\cos\phi \\ 0 & \cos\theta & -\sin\phi \\ -\sin\theta & \cos\theta\sin\phi & \cos\theta\sin\phi \end{bmatrix} =$$
$$\begin{bmatrix} -HI\cos\theta - & -HI\sin\theta\sin\phi + & -HI\sin\theta\cos\phi + \\ VI\sin\theta & VI\cos\theta\sin\phi & VI\cos\theta\cos\phi \end{bmatrix}$$

(d) When Heading West:

$$[xMag \ yMag \ zMag] =$$
$$[0 \ -HI \ VI] \begin{bmatrix} \cos\theta & \sin\theta\sin\phi & \sin\theta\cos\phi \\ 0 & \cos\theta & -\sin\phi \\ -\sin\theta & \cos\theta\sin\phi & \cos\theta\sin\phi \end{bmatrix} =$$
$$\begin{bmatrix} -VI\sin\theta & HI\cos\phi + & HI\sin\phi + \\ & VI\cos\theta\sin\phi & VI\cos\theta\cos\phi \end{bmatrix}$$

Where:
HI Horizontal intensity of the local magnetic field;
VI Vertical intensity of the local magnetic field;
$\theta$ Aircraft pitch angle;
$\phi$ Aircraft bank angle;
$\psi$ Aircraft magnetic heading;
xMag x-axis theoretical magnetometer reading;
yMag y-axis theoretical magnetometer reading; and
zMag z-axis theoretical magnetometer reading.

The deviation of the magnetometer readings from the above values is referred to as the hard iron offset of the unit being calibrated and, in accordance with the provided method, will be subtracted from the magnetometer readings resulting in the following equation for the corrected heading:

$$\Psi = \tan^{-1}\left(\frac{Y_s}{X_s}\right)$$

Where:

$X_s = (X_b - X_{cal})\cos\theta + (Y_b - Y_{cal})\sin\theta\sin\phi + (Z_b - Z_{cal})\sin\theta\cos\phi$ $Y_s = (Y_b - Y_{cal})\cos\phi - (Z_b - Z_{cal})\sin\phi$ $Z_s = (X_b - X_{cal})\sin\theta - (Y_b - Y_{cal})\cos\theta\sin\phi - (Z_b - Z_{cal})\cos\theta\cos\phi$ Where:
$X_b$ x-axis magnetometer reading;
$Y_b$ y-axis magnetometer reading;
$Z_b$ z-axis magnetometer reading;
$X_{cal} = X_b - xMag$ x-axis magnetometer calibration value;
$Y_{cal} = Y_b - yMag$ y-axis magnetometer calibration value; and
$Z_{cal} = Z_b - zMag$ z-axis magnetometer calibration value.

Thus, summarizing the above method for initially calibrating a heading system installed in a vehicle, actual readings are obtained from one or more magnetometers at one or more headings for the vehicle, such as preferably at the four different magnetic headings corresponding to North, South, East, and West, and a set of theoretical magnetic field properties of the Earth is also obtained at those same locations, such as from a web site containing this information. These theoretical values include values for the horizontal and vertical intensity of the magnetic field at each of these locations for the vehicle as well as the total field. A theoretical reading for the magnetometer at each of these headings is computed and then compared against the actual magnetometer readings at these same locations to obtain calibration values for the heading system. These calibration values are then utilized, such as by averaging all of the calibration values obtained, to provide a universal average gain and offset for the magnetometer, thus, universally calibrating the heading system with respect to measurement errors. In some embodiments, a universal average gain can be obtained by calculating a ratio of the average theoretical magnetometer reading and average actual magnetometer reading at the different magnetic headings and/or by obtaining multiple ratios associated with the different magnetic headings that can be averaged to provide an average universal gain. This calibration method is preferably performed with the engine and avionics of the aircraft running, or corresponding equipment on the vehicle running. If desired, these calibration values can be filtered through low pass filters to reduce any effects of noise.

Although the calibration method 100 can be accomplished at a single position of the vehicle, it has been found that the accuracy is preferably enhanced by doing it at the four normal directional headings of the compass; namely, North, South, East, and West.

Figure 2:
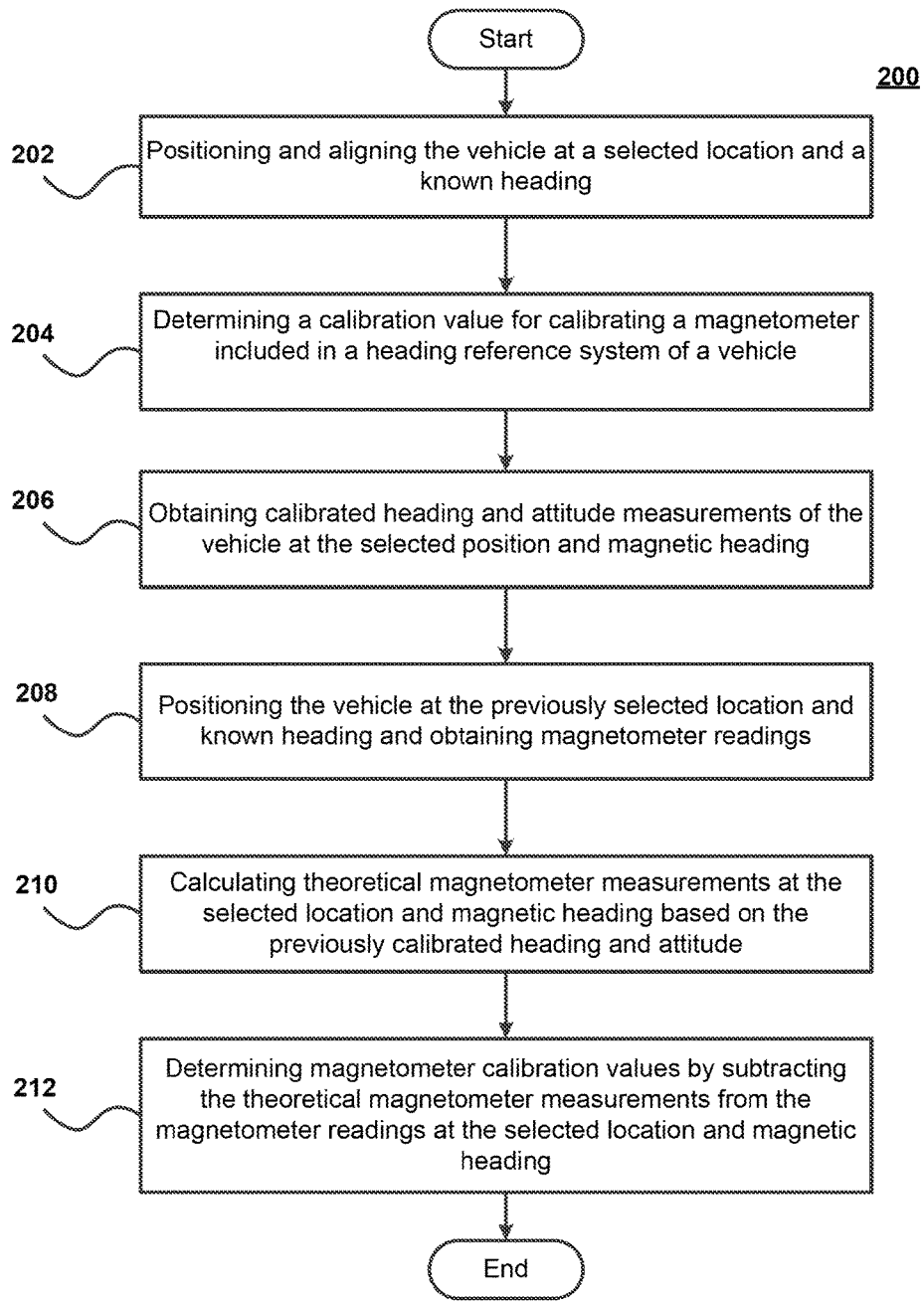
FIG. 2 is a flow diagram illustrating a process for re-calibrating a heading reference system in accordance with some embodiments of the present invention.

Referring now to FIG. 2, a process flow diagram illustrates an exemplary method 200 for calculating magnetometer calibration values (e.g., $X_{cal}$, $Y_{cal}$, $Z_{cal}$) and performing a re-calibration of the heading system in accordance with certain embodiments of the present invention. In some embodiments, an initial calibration of the AHRS is performed like the one illustrated, for example, in previously presented FIG. 1 in order to compensate for hard iron effects in the magnetometers. In order to perform an initial calibration, the vehicle is positioned at one or more selected locations and aligned to one or more known magnetic headings as shown at 202.

At 204, magnetometer calibration values are determined based on the employed calibration method. For example, such calibration values can be obtained by calculating the deviation between the magnetometer readings at one or multiple selected locations and magnetic headings and theoretical magnetometer measurements calculated for the same locations and magnetic headings. In some embodiments any suitable calibration method can be performed to obtain magnetometer calibration values. Upon obtaining the calibration values for the magnetometers, the AHRS can be calibrated to provide corrected heading and attitude measurements as shown at 206.

In some embodiments, it may be required to perform a re-calibration of the AHRS system to account for any additive hard iron presence in the vicinity of the magnetometers. For example, additional instruments with ferrous materials may be added in the cockpit of an aircraft necessitating an adjustment of the previous calibrated heading. In some embodiments, the previously computed magnetometer calibration values may need to be recomputed for additional processing purposes relating to the use of Inertial Measurement Units (IMU) in providing navigation measurements. This can be accomplished at 208 by positioning the vehicle at a single, previously selected location and known heading allowing for the calculation of the previously calibrated magnetometer readings using the known heading, pitch and roll angles and obtaining magnetometer readings.

At 210, theoretical magnetometer measurements can be computed by obtaining theoretical magnetic properties of the Earth corresponding to the previously known selected location and the previously obtained calibrated heading and attitude of the vehicle. At 212, the magnetometer calibration values are computed by subtracting the theoretical magnetometer measurements from the magnetometer readings obtained at 208 resulting in the following equations for the computed magnetometer calibration values.

$$X_{cal} = X_b - (VI \sin\theta - HI \cos\theta \cos\psi)$$

$$Y_{cal} = Y_b - (HI \sin\psi \cos\phi - HI \sin\phi \cos\psi \sin\theta - VI \cos\theta \sin\phi)$$

$$Z_{cal} = Z_b - (-HI \sin\psi \sin\phi - HI \cos\phi \cos\psi \sin\theta - VI \cos\theta \cos\phi)$$

Where:
$X_b$ x-axis magnetometer reading;
$Y_b$ y-axis magnetometer reading;
$Z_b$ z-axis magnetometer reading;
$X_{cal}$ x-axis magnetometer calibration value;
$Y_{cal}$ y-axis magnetometer calibration value;
$Z_{cal}$ z-axis magnetometer calibration value;
$\psi$ known calibrated magnetic heading;
$\theta$ known calibrated pitch angle;
$\phi$ known calibrated roll angle;
HI Horizontal intensity of the magnetic field at known location; and
VI Vertical intensity of the magnetic field at known location.

Figure 3:
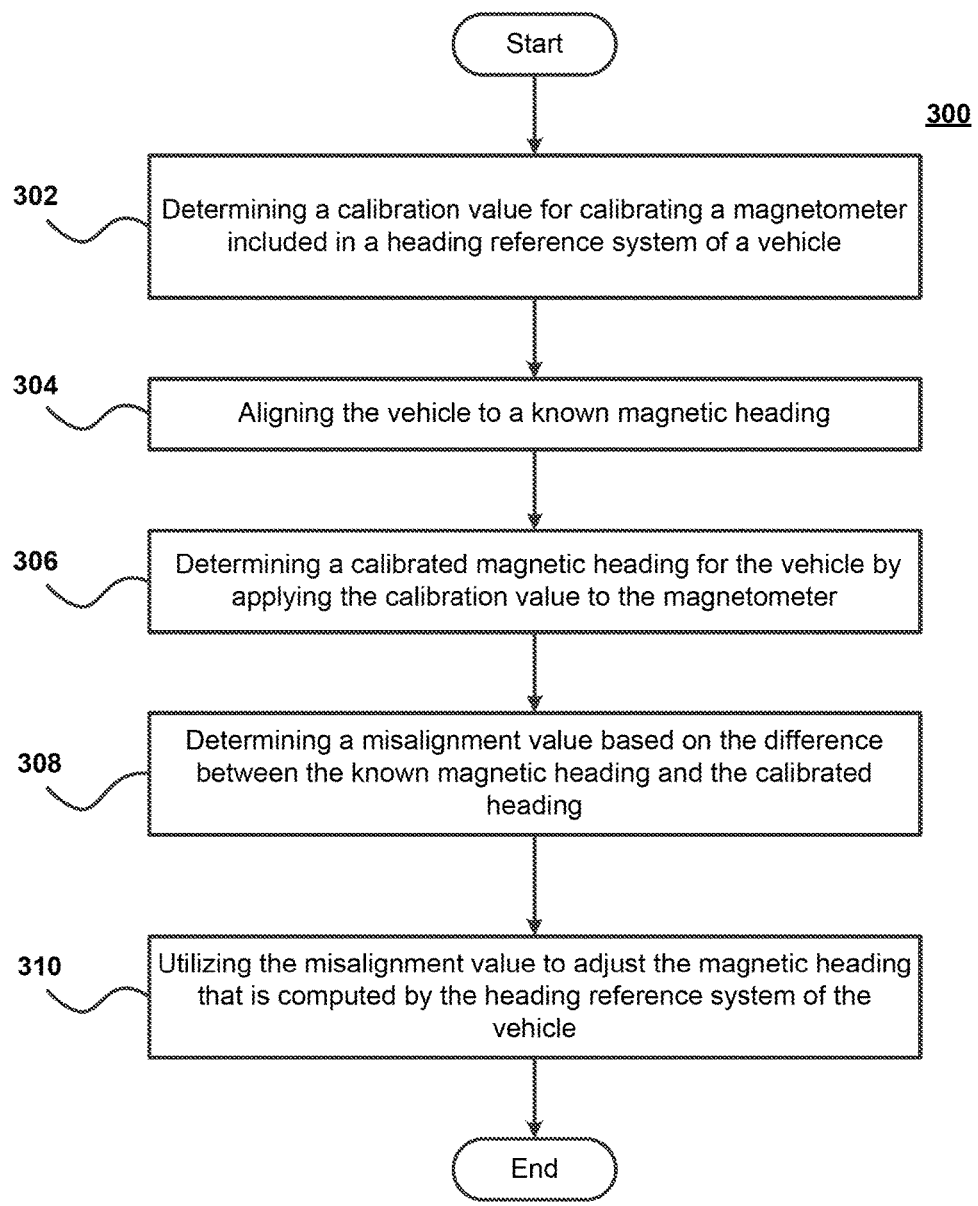
FIG. 3 is a flow diagram illustrating a process for determining magnetometer misalignment and calibrating a heading reference system in accordance with some embodiments of the present invention.

Referring now to FIG. 3, a process flow diagram illustrates an exemplary method 300 for determining and computing misalignment values for the one or more magnetometers in an AHRS system. In some embodiments, the installation (e.g., mounting) of one or more triaxial magnetometers may not be aligned correctly with the chosen vehicle axes. As a result, the magnetometers can exhibit a constant misalignment offset causing the AHRS system to provide erroneous heading measurements, which can affect the reliability and navigation of the vehicle. In such cases, method 300 can provide a solution by determining the presence of a magnetometer misalignment. Moreover, if such a determination is made during installation of the magnetometer on the vehicle (e.g., during a manufacturing testing phase) then the appropriate actions can be taken by either replacing and/or re-installing the triaxial magnetometer. Additionally, in some embodiments, such a determination may be made at a later time (e.g., after installation) to account for possible maintenance and/or repair issues of the vehicle. In such cases, the computed misalignment value for the magnetometer can be used to further calibrate the AHRS system in order to obtain corrected heading and attitude measurements.

Initially at 302, method 300 determines a calibration value for the magnetometers that are included in the AHRS system of a vehicle. In some embodiments, calibration values can be obtained using method 100 that was previously described in connection with FIG. 1. In some embodiments, the AHRS system may be readjusted and calibration values can be re-computed using method 200 described above in connection with FIG. 2.

At 304, the vehicle is aligned at a known magnetic heading. For example, in some embodiments the vehicle can be aligned to a common heading, such as any of North, South, East and West, or any other suitable heading. At 306, the calibrated magnetic heading of the vehicle can be determined by applying the magnetometer calibration values included in the AHRS system.

At 308, misalignment values for the magnetometers can be determined by comparing the obtained calibrated heading with the known magnetic heading. Specifically, the difference between the calibrated magnetic heading and the known heading can provide the misalignment value for the installed magnetometer with respect to the lateral and longitudinal axis of the vehicle.

In some embodiments, the misalignment value of the magnetometer can be utilized to adjust for deviations by further calibrating the AHRS system at 310. For example, the misalignment value of the magnetometer can be subtracted from the measured magnetometer values of the lateral and longitudinal axes. The misalignment value can also be used to adjust for deviations associated with other vehicle equipment as well.

Figure 4:
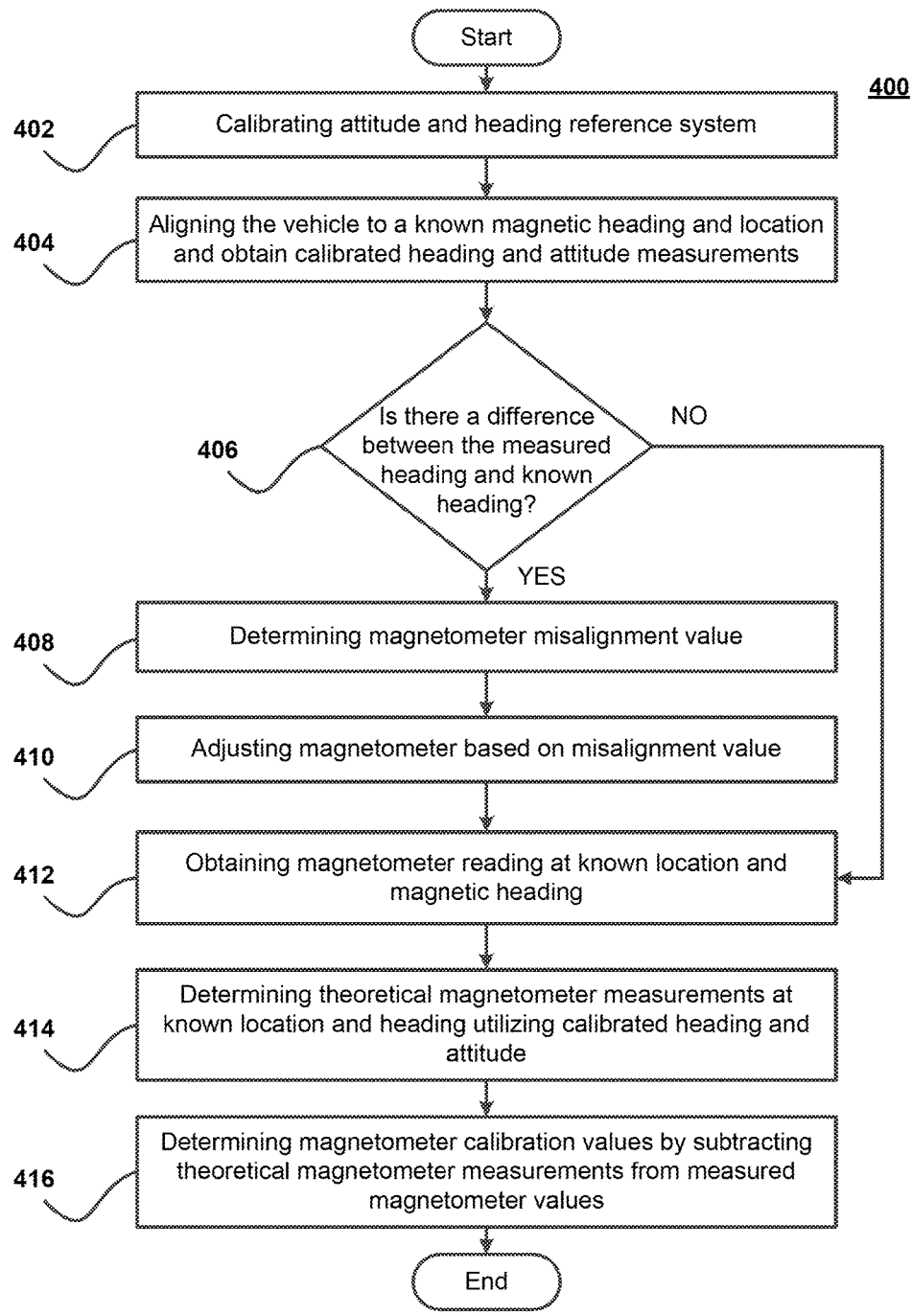
FIG. 4 is a flow diagram illustrating a process of adjusting for deviations in a heading reference system in accordance with some embodiments of the present invention.

FIG. 4 is a process flow diagram illustrating an exemplary method 400 that adjusts for deviations relating to hard iron effects and installation misalignments in an AHRS system. Specifically, at 402 the vehicle's AHRS system is calibrated to obtain corrected heading and attitude measurements. In some embodiments, a calibration is achieved using the method described in connection with FIG. 1 or any other suitable calibration method. At 404, the vehicle is aligned at a known magnetic heading at a specific location and corrected heading and attitude measurements are obtained from the calibrated AHRS. For example, a specified location can be identified at an airport such that it provides magnetic markings and a flat surface in order to facilitate the maintenance of the aircraft.

At 406, the obtained heading measurement is compared to the known magnetic heading. If there is a difference between the heading measurement and known magnetic heading (e.g., "YES" at 406), then the measured difference represents the misalignment value of the magnetometer with respect to the lateral and longitudinal axes of the vehicle as shown at 408. Such magnetometer misalignment can occur during installation (e.g., mounting) of the magnetometer on the vehicle. Failing to account for the misalignment during calibration can result in erroneous AHRS heading measurements, which in turn can negatively affect the navigation of the vehicle and create dangerous conditions when the vehicle is in operation. Accordingly, at 410, the misalignment value can be subtracted from the magnetometer measurement to correct for installation defects and to compute corrected magnetometer readings at the known heading and location as shown at 412.

If there is no difference measured between the known magnetic heading and calibrated heading measurement obtained from the AHRS (e.g., "NO" at 406), then method 400 proceeds to 412 to obtain magnetometer readings at the known magnetic heading and location of the aircraft.

Moreover, at 414 the theoretical magnetometer measurements are computed based on the obtained calibrated heading, attitude (e.g., pitch angle, roll angle) and the properties of the Earth's magnetic field (e.g., horizontal and vertical intensity) at the known location.

At 416, the magnetometer calibration values are obtained by subtracting the theoretical magnetometer measurements from the obtained magnetometer measurements. In some embodiments, the magnetometer calibration values can be used to re-calibrate the AHRS system in the case that new hard iron disturbances are present and/or can be used as an estimate of previously computed magnetometer calibration values.

Figure 5:
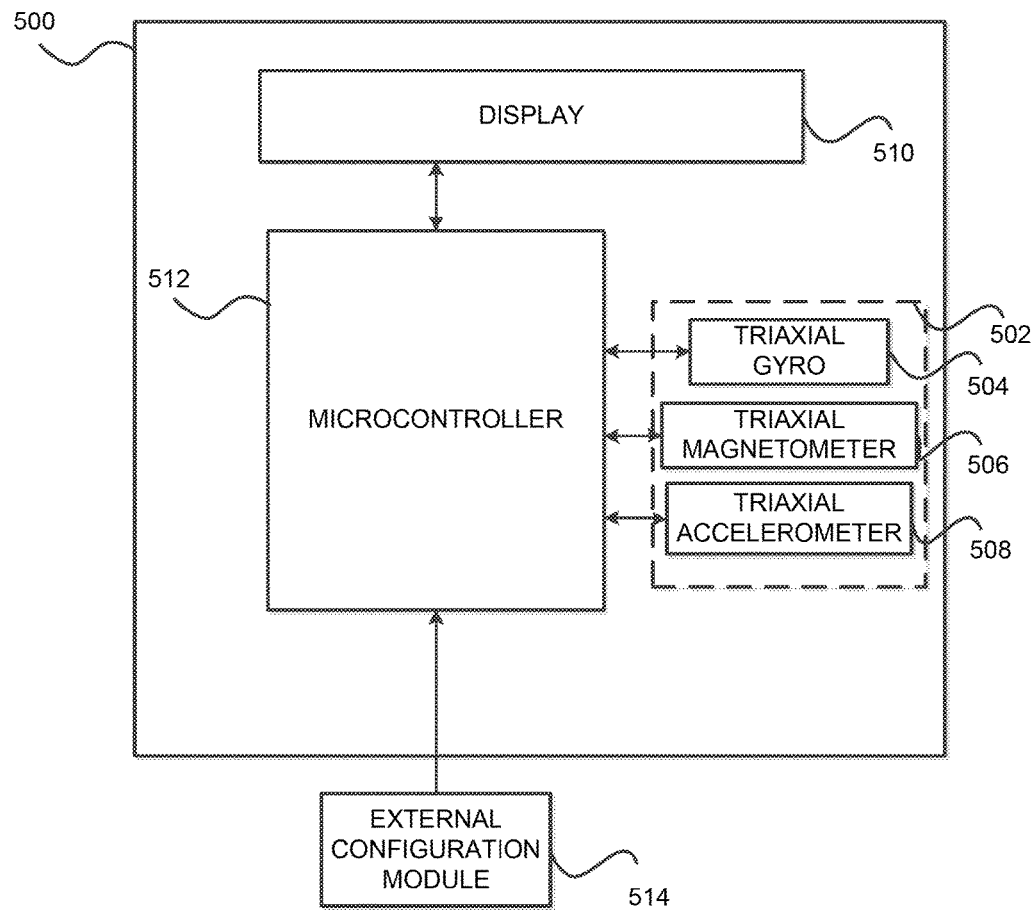
FIG. 5 is a block diagram of a heading reference system in accordance with some embodiments of the present invention.

FIG. 5 is a block diagram illustrating an exemplary attitude and heading reference system 500 in accordance with some embodiments of the disclosed subject matter. The heading reference system 500 may be incorporated into an aircraft, maritime vessel or other vehicle. The heading reference system 500 may be configured to perform the methods disclosed in FIGS. 1-4 either independently or in conjunction with other components of the vehicle that includes the heading reference system 500.

As shown in FIG. 5, a heading and reference system 500 includes an inertial measurement unit 502 which includes triads of gyroscopes 504, magnetometers 506 and accelerometers 508. The calibration methods disclosed above may be being utilized in conjunction with the magnetometers 506 and accelerometers 508. As shown, attitude and heading reference system 500 may also include a display 510. The display 510 may include one or more liquid crystal displays (LCDs), light emitting diodes (LEDs), organic light emitting diodes (OLEDs) and/or any other suitable display components. Additionally, heading reference system 500 can include microcontroller 512 that receives external inputs from an external configuration module 514 (e.g., which may include the theoretical values and properties mentioned above and/or manual entries of additional parameters such as known and/or previously calibrated heading values) as well as internal inputs from any and/or all of the components of inertial measurement unit 502 (e.g., which may include data associated with the actual magnetic readings and any other related data). In some embodiments, system 500 can include a global positioning system (GPS) or other navigation sensors to provide additional navigation information (e.g., course of vehicle).

In some embodiments attitude and heading reference system 500 can be any suitable aircraft heading reference system, such as an integrated standby unit, a primary or secondary attitude and heading reference system, an air data and attitude heading reference system, or inertial navigation systems; as well as any suitable non-aircraft system such as a vehicle or inertial system that requires a source of heading.

System 500 is responsible for determining heading and attitude of a vehicle using magnetometers 506 and accelerometers 510. In some embodiments, such determination can be made while the vehicle is stationary (e.g., on the ground) and/or during normal operations of the vehicle (e.g. during aircraft flight). For example, in some embodiments, an aircraft can be positioned at a specified flat area within airport grounds that can include designated markings identifying known magnetic headings (e.g., resembling a compass rose) which can eliminate the need for obtaining multiple magnetic measurements in order to account for variations of the ground's surface. Microcontroller 512 can then determine calibration and/or re-calibration values for magnetometers 506 in order to provide a corrected heading and attitude of the vehicle in accordance with some embodiments of the disclosed subject matter. As a result, the attitude and heading reference system can be used for measurement, computation and display of critical navigation information such as, inter alia, pitch, roll, yaw, magnetic and true heading angles.

In some embodiments, system 500 may further include one or more non-transitory, physical storage devices (not shown) that can store any and all data associated with the heading system 500 including, but not limited to, any data associated with the internal and external inputs. The storage device may further store computer program instructions associated with any or all of the above activities that involve adjusting the heading system (or associated components) including any activities discussed above with reference to FIGS. 1-4. The microcontroller 512 may communicate with the storage device to access any of the stored data and/or to execute any of the stored instructions.

While there have been shown and described various novel features of the invention as applied to particular embodiments thereof, it should be understood that various omissions and substitutions and changes in the form and details of the systems and methods described and illustrated, may be made by those skilled in the art without departing from the spirit of the invention. Those skilled in the art will recognize, based on the above disclosure and an understanding therefrom of the teachings of the invention, that the general structure and functionality provided by and incorporated therein, may vary in different embodiments of the invention. Accordingly, the particular systems and methods shown in FIG. 1-FIG. 5 are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation, and the present invention is limited only by the claims which follow.

What is claimed is:

1. A method for recalibrating an aircraft heading system comprising at least one magnetometer, the method comprising the steps of:
 positioning the aircraft at a location on the ground along the Earth's surface at a single known magnetic heading;

obtaining a reading from the at least one magnetometer at the known magnetic heading while the aircraft is stationary on the ground;

computing a value for the at least one magnetometer at the known magnetic heading based on at least a calibrated magnetic heading that was determined during an initial calibration of the aircraft heading system;

calculating a recalibrated offset based on the reading and the computed value for the at least one magnetometer; and utilizing the recalibrated offset to recalibrate the aircraft heading system.

2. The method of claim 1, wherein the recalibrated offset for the at least one magnetometer is computed according to the following equations:

$$X_{cal}=X_b-(VI \sin \theta - HI \cos \theta \cos \varphi)$$

$$Y_{cal}=Y_b-(HI \sin \psi \cos \varphi - HI \sin \varphi \cos \psi \sin \theta - VI \cos \theta \sin \varphi)$$

$$Z_{cal}=Z_b-(-HI \sin \psi \sin \varphi - HI \cos \varphi \cos \psi \sin \theta - VI \cos \theta \cos \varphi)$$

wherein the at least one magnetometer comprises a triaxial magnetometer, and where:

$X_b$ is the obtained x-axis magnetometer reading $Y_b$ is the obtained y-axis magnetometer reading $Z_b$ is the obtained z-axis magnetometer reading $\psi$ is the calibrated magnetic heading $\theta$ is a calibrated pitch angle $\varphi$ is a calibrated roll angle HI is the horizontal intensity of the Earth's magnetic field at the location of the positioned aircraft VI is the vertical intensity of the Earth's magnetic field at the location of the positioned aircraft.

3. The method of claim 1, wherein the reading from the at least one magnetometer is obtained while an engine and avionics of the aircraft are running.

* * * * *